United States Patent Office 3,239,473
Patented Mar. 8, 1966

3,239,473
CONDENSATION POLYMERS OF CYANOPENTA-
BENZYLISONITRILE IRON (II) CATION AND
ALDEHYDES, AND THEIR PREPARATION
Walter Zygfried Heldt, Wilmington, Del., assignor to
E. I. du Pont de Nemours and Company, Wilmington,
Del., a corporation of Delaware
No Drawing. Filed Aug. 25, 1961, Ser. No. 133,764
6 Claims. (Cl. 260—2)

This invention relates to a new class of polymeric materials. More particularly, this invention relates to polymeric materials which are the condensation products of formaldehyde or alkyl aldehydes and complexes containing the cyanopentabenzylisonitrileiron (II) cation, $$[Fe(C_6H_5CH_2NC)_5CN]^+$$

Cyanopentaisonitrile complexes of iron of the type $(FeZ_5CN)_yX$ wherein Z represents a substituted methylisonitrile ligand having at least one carbon-to-carbon multiple bond adjacent and singly bound to the alpha carbon atom; X denotes an anion; and y is an integer equal in magnitude to the valence of the anion, are described in copending, coassigned application Serial No. 42,961, now U.S. Patent No. 3,062,855, issued November 6, 1962. These complexes are prepared by mixing at a temperature above about 50° C. either an alkali metal ferrocyanide or a tetrasubstituted ammonium ferrocyanide with an activated alkylating agent. The activated alkylating agent has the formula $R'_2R''CX'$ wherein each of the R' radicals is either hydrogen, lower alkyl (one to six carbon atoms) or aryl; wherein R'' is an activating group; and wherein X' is an anion selected from the group consisting of chloride, bromide and sulfonate. The activating group is a radical containing at least one carbon-to-carbon multiple bond, such as phenyl, vinyl, thienyl, furyl, ethynyl, naphthyl, and the like, and is bonded to the carbon of the alkylating agent through one of the multiple-bonded carbon atoms. Specifically, the benzylisonitrile complexes useful in the invention are prepared from the ferrocyanide and a benzyl halide in accordance with the method set forth.

The polymeric materials provided by this invention are complex molecules which have as repeat units cyanopentabenzylisonitrileiron (II) cations, coupled together by methylene radicals attached to the phenyl rings, the cations being neutralized electrically by hydrogen sulfate anions. The basic cyanopentabenzylisonitrileiron (II) cation has a structure consistent with the formula:

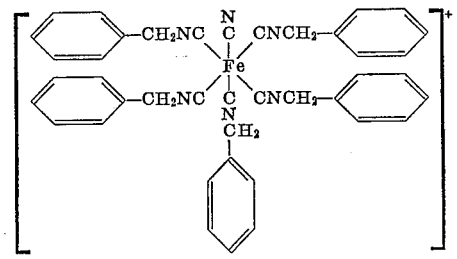

Coupling by methylene groups through the phenyl rings provides intermolecular linkages of the type

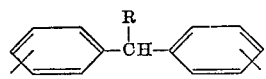

wherein R may be hydrogen or an alkyl radical containing from one to twelve linear carbon atoms.

Of course, it is difficult to ascertain with complete certainty the position of each of the methylene or substituted methylene groups with respect to the ligands in each cation since it is possible that alkylation occurs preferentially on a particular ring or rings in more than one position rather than on several rings. The structures shown herein should be interpreted in this light, therefore.

In addition to linkages between cations, as described above, intramolecular linking by methylene groups in para position on two adjacent phenyl rings within the same cation also may occur, and the structures of the cyanopentabenzylisonitrileiron (II) cations are modified accordingly, i.e.,

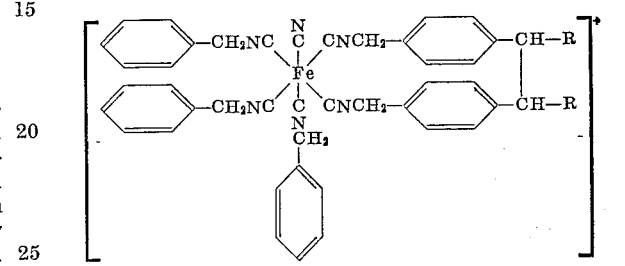

and

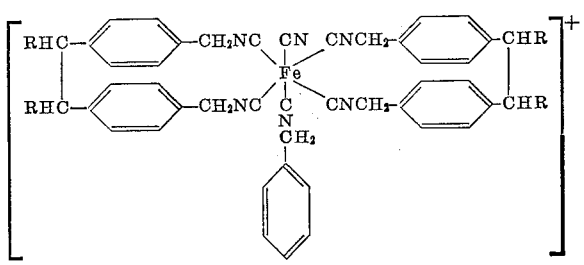

In each of the cation moieties, there is always one benzylisonitrile ligand which remains unsubstituted.

The polymeric compositions provided by this invention comprise repeating units selected from the group consisting of (A) 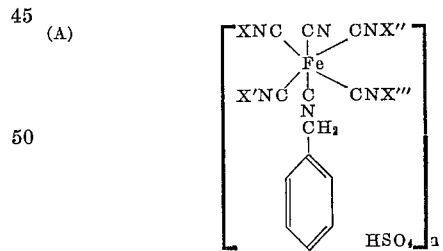

wherein X, X', X'' and X''' are radicals selected from the group consisting of

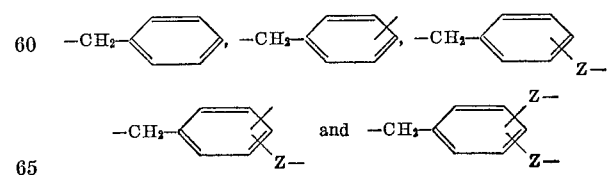

where Z is a member selected from the group consisting of methylene, alkyl substituted methylene, oxydimethylene and alkyl substituted oxydimethylene, and $n$ is a number greater than 1;

(B)

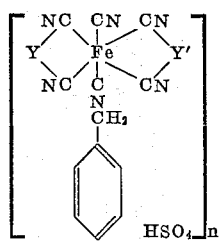

wherein Y and Y' are members selected from the group consisting of

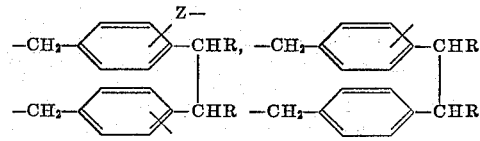

and

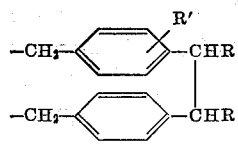

wherein R is a member of the group consisting of hydrogen and alkyl radicals, and R' is a member of the group consisting of hydrogen, methylene, alkyl substituted methylene, oxydimethylene and substituted oxydimethylene, and $n$ is a number greater than 1; and (C)

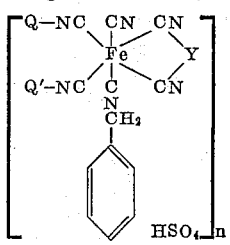

wherein Q and Q' are members of the group consisting of

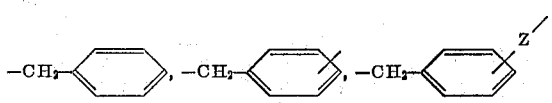

and

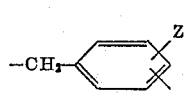

and $n$ is a number greater than 1, with the proviso that for each member of the group consisting of methylene, alkyl substituted methylene, oxydimethylene and alkyl substituted oxydimethylene contained within said repeating unit, there must be a complementary member of said group contained within the same repeating unit, with the further proviso that in all instances said alkyl radical is from the group consisting of alkyl radicals having from 1 to 12 carbon atoms.

By the term complementary member, applicant intends to connote that when any of the substituents of the repeating unit presents a free bond, there must be present in the same repeating unit, a constituent which will accept such a free bond.

Typical of the polymers of this invention are those formed by reaction with formaldehyde which have repeating units consistent with the structures:

(I)

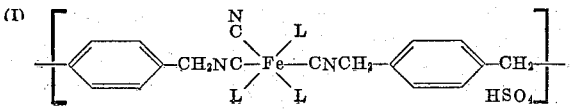

(II)

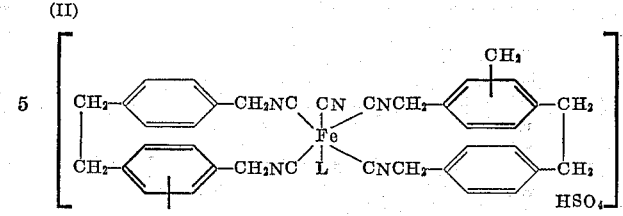

(III)

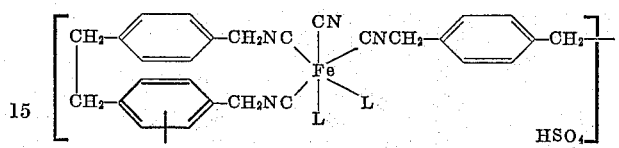

(IV)

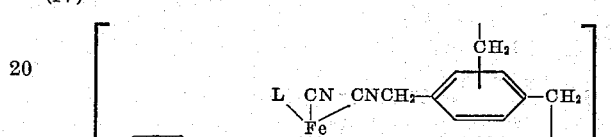

(V)

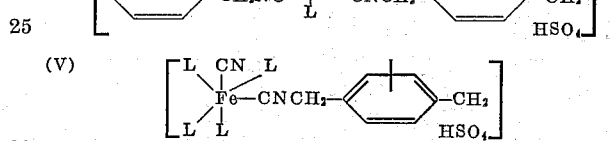

etc., wherein the "L" in each of the above structures represents an unreacted isonitrile ligand, i.e., $C_6H_5CH_2NC$ ligand. Of course, those polymers prepared from alkyl aldehydes or from a mixture of formaldehyde and an alkyl aldehyde will have in place of some or all of the methylene and dimethylene linking groups, alkyl-substituted linking groups, e.g.,

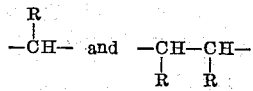

wherein R represents the alkyl radical characteristic of the aldehyde. By the very nature of the reaction, it will be obvious to those skilled in the art that some of the linking groups may be oxydimethylene or substituted oxydimethylene groups, for instance

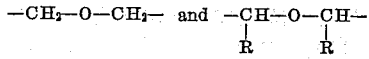

wherein R is as defined above.

The process leading to these novel polymers comprises contacting a solution of a cyanopentabenzylisonitrileiron (II) salt in concentrated sulfuric acid or in concentrated sulfuric acid containing a diluent, with the appropriate aldehyde at relatively low temperatures. Depending upon the reactants, their concentration, and/or the concentration of the acid employed, polymeric materials ranging from oils and gums to relatively high melting solids are obtained.

The cyanopentabenzylisonitrileiron (II) salts useful in the process of this invention are those which on contact with sulfuric acid convert to the hydrogen sulfate salt. Thus, it is preferred to employ as starting material the hydrogen sulfate salt per se or a halide salt such as the bromide, chloride or iodide salt which is readily converted to the hydrogen sulfate on dissolution in the sulfuric acid. Preferred aldehydes are formaldehyde, useful for instance, in the form of paraformaldehyde or trioxan, alkyl aldehydes of 2 to 13 carbons, i.e., the alkyl radical contains from one to twelve carbon atoms, such as acetaldehyde, propionaldehyde, octylaldehyde, and the like, and mixtures of these aldehydes.

Concentrated sulfuric acid or concentrated sulfuric acid diluted with glacial acetic acid, water, etc., is employed as reaction medium. The sulfuric acid acts as the solvent for the complex. The diluent aids in controlling the rate of reaction. Mixtures containing concentrations from about 0–50% glacial acetic acid as diluent are suitable for the reaction as are aqueous solutions containing at least 75% sulfuric acid. Although the use of more dilute solutions of sulfuric acid is permissible, the reaction rate is reduced to the extent that it is not generally feasible economically, unless, of course, employed in conjunction with high temperatures.

Temperatures suitable for the reaction range from about 5° to 60° C. under optimum operating conditions. The particular temperature chosen will depend upon the particular reactants and upon whether, and in what quantity, diluent has been employed in the reaction medium. Although higher temperatures are allowable, when the temperature exceeds about 75° C. there is little control of the reaction, and hence little control over the extent of polymerization in the final product. The higher temperatures are employed especially with relatively long chain alkyl aldehydes, since in general reaction rate is reduced proportionately as the number of carbons in the alkyl chain increases.

The following examples will serve to illustrate further the method of practicing this invention and are to be construed in no way as limiting. In each instance, parts are given by weight unless otherwise designated.

*Example I*

To 368 parts of concentrated sulfuric acid is added 23.0 parts of cyanopentabenzylisonitrileiron (II) bromide, and the reaction mixture is stirred at room temperature for two hours to ensure the total conversion of the salt into its hydrogen sulfate. To the yellow solution is then added 4.5 parts of paraformaldehyde. A slurry forms immediately and the temperature increases to about 40° C. The reaction mixture is stirred at room temperature for three hours and is then poured onto about 500 parts of ice. (The polymerization is essentially complete after about 50 sec. at 40° C. and no prolonged stirring is necessary.) A yellow-orange solid precipitates (96 parts) and the solid is washed several times with fresh batches of water. The yellow product is extracted in a Soxhlet apparatus with acetone for 46 hours and is dried at 100° C. under 1 mm. pressure whereby 25.8 parts of dry product is obtained. The product melts over the range 280–320° C. with darkening. The product is insoluble in all common organic solvents. Chemical analyses indicate that the empirical formula of the product is nearly consistent with that calculated for $$C_{46}H_{39}N_6Fe \cdot HSO_4^- \cdot 5H_2O$$

*Analysis.*—Calcd.: C, 60.13; H, 5.48; N, 9.15; Fe, 6.08; S, 3.49; H$_2$O, 9.7. Found: C, 60.21; H, 4.62; N, 8.73; Fe, 5.92; S, 3.67; H$_2$O, 7.6.

Chemical tests and degradation studies have been employed to ascertain some of the structural characteristics of the polymeric substance. The structural representation of the repeat unit

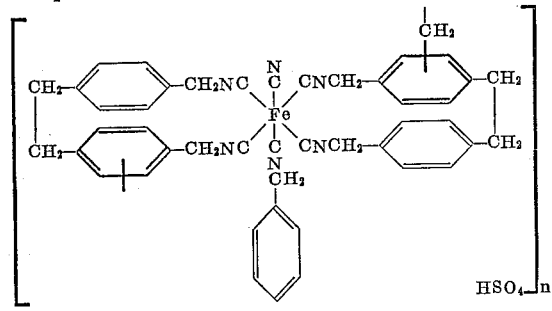

is assigned on the basis of the following information:

A. The presence of an unreacted benzylisonitrile ligand is indicated by (1) the isolation of benzyl bromide on reacting the polymer with allyl bromide (transalkylation) and (2) the isolation of methyl benzyl ether by reacting the polymer with methanol at 150° C. under 900 atmospheres carbon monoxide pressure. These reactions are also characteristic of the starting complex, indicating that the basic structure of the starting material is probably intact within the polymer molecule.

B. The presence of the groups C$_6$H$_5$CH$_2$— and

is indicated by the isolation and identification of methyl benzoate and dimethyl terephthalate from the series of reactions involving oxidation of the polymer with potassium permanganate in sodium hydroxide, alkali fusion of the resulting keto acids and their esterification with diazomethane by standard techniques. A small quantity of unidentified tribasic acid is also indicated in the reaction products.

C. Quantitative oxidation with sodium dichromate converts the polymer to a pentaketone species, which upon reaction with periodic acid consumes 1.1 moles per mole of pentaketone; this suggests the presence of at least one, and probably two, alpha-diketo groupings, most likely obtained by the oxidation of dimethylene groups.

*Example II*

Following the procedure of Example I except that 3.85 parts of cyanopentabenzylisonitrileiron (II) bromide, 0.3 part of formaldehyde and 9.30 parts of concentrated sulfuric acid are contacted for 18 minutes, a polymeric product is obtained. The product is insoluble in common organic solvents. Analyses indicate that the empirical formula of the product corresponds essentially to that calculated for C$_{43}$H$_{35}$N$_6$Fe·HSO$_4^-$·3H$_2$O.

*Analysis.*—Calcd.: C, 61.28; H, 5.02; N, 9.97; Fe, 6.62; S, 3.80. Found: C, 61.99; H, 4.65; N, 9.08; Fe, 6.55; S, 3.27.

The product is less stable chemically than that obtained in Example I. Treatment of the product as in (B) of Example I results in the formation of benzoic acid and of terephthalic acid, isolated in the form of the methyl esters. There is no evidence for the formation of any tribasic acid. Results of the bichromate oxidation, etc., of the product [(C) of Example I] give no indication of the presence of dimethylene groups. Therefore, the following structural representation of the repeat unit of the product is assigned:

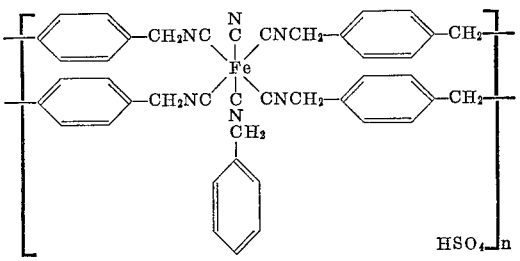

*Example III*

Following the procedure of Example I except that 23 parts of cyanopentabenzylisonitrileiron (II) bromide, 1.8 parts of formaldehyde and 368 parts of concentrated sulfuric acid are contacted for 3 minutes, a polymeric product is obtained. The product is soluble in dimethyl sulfoxide. The inherent viscosity (measured at 30.2° C. for a solution containing 0.5 g. of product per 100 ml. of dimethyl formamide as solvent) is 0.029. On treatment of the product as in (B) of Example I, benzoic acid and terephthalic acid, the only polybasic acid isolated, are isolated as the methyl esters.

Analyses are consistent with the empirical formula: $C_{42}H_{35}N_6Fe \cdot HSO_4^- \cdot 2H_2O$. The following structural formula is assigned:

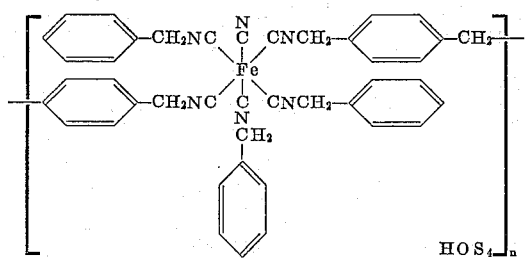

*Analysis.*—Calcd. C, 62.06; H, 4.96; N, 10.34; Fe, 6.87; S, 3.95. Found: C, 62.77; H, 4.51; N, 9.55; Fe, 6.89; S, 4.46.

*Example IV*

To 35 parts of concentrated sulfuric acid cooled to 10° C. is added 3.75 parts of cyanopentabenzylisonitrileiron (II) bromide and the solution is stirred at room temperature for about 1 hour. The solution is added to 3.2 parts of n-octyl aldehyde and the mixture is stirred for 10 hours at room temperature. The mixture is then poured onto ice, and a brown oil separates out. The oil is washed well with ice water and diethyl ether and then is dissolved in methanol and on treatment with diethyl ether a semi-solid product separates which is dried at 25° C. and 1 mm. pressure.

The product is soluble in solvents such as chloroform, acetone, methyl ethyl ketone and methanol. The polymeric material has an inherent viscosity (measured for an absolute methanol solution containing 1.0 g. of polymer per 100 cc. of solvent) of 0.039 at 25° C. The polymer cures in a vacuum oven at 120° C. and 1 mm. pressure after 2 hours to a product whose inherent viscosity (measured for an absolute methanol solution containing 1.0 g. of polymer in 100 cc. of solvent at 30.2° C.) is 0.0953.

The uncured product has an empirical formula:

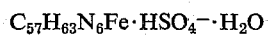

*Analysis.*—Calcd.: C, 68.23; H, 6.63; Fe, 5.57; S, 3.12. Found: C, 68.57; H, 7.52; Fe, 5.48; S, 2.68.
The structure

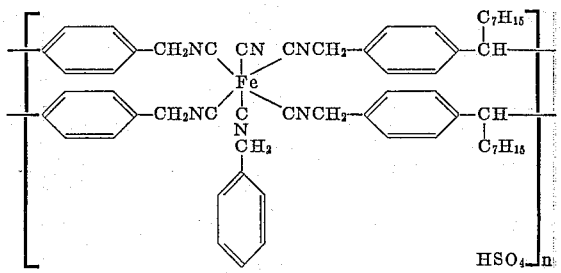

is assigned on the basis of oxidation and degradation studies. Oxidation with sodium dichromate in 50% sulfuric acid solution indicates the presence of some

groups which probably accounts for the ability of the polymer to cure to a higher molecular weight product. The cured product contains the oxidimethylene linking group as evidenced by its infrared spectrum.

The properties of the polymers of this invention cover a wide range. The polymeric materials range from light yellow to dark brown in color and from oils to insoluble solids having melting and softening points as high as 320° C. They are extremely resistant to acid and base, showing great hydrolytic stability at high acid and base concentrations. For instance, to effect hydrolysis of the insoluble polymers, treatment with 50% sulfuric acid for 60 hours at 120–150° C. is required. The polymers appear also to have a cellular structure, retaining very large amounts of liquids, for example, 1 gram of solid polymer absorbs 5 to 8 grams of water, and complete removal of the liquid is difficult to achieve. Even chloroform is tenaciously held and often is not completely removed after prolonged drying under vacuum.

Because of the somewhat unexpected stabilities of these polymers, all attempts at decomposition require very extreme conditions and often result only in the isolation of starting polymer or a derivative thereof, such as a sulfonated or nitrated, intact polymer, making complete structural analysis impractical.

The molecular weights and related solubility and physical characteristics of the polymeric products are dependent upon at least two factors: (1) the molar ratio of aldehyde and complex employed in the reaction; and (2) the quantity of diluent employed for a given ratio of complex and aldehyde. For example, as the ratio of aldehyde to complex is increased from about 1 to 5 and higher, the solubilities of the products in organic solvents such as benzonitrile, acetonitrile, dimethylformamide, dimethyl sulfoxide, n-butyl alcohol, dimethylacetamide, and mixtures thereof, decrease and the products become higher melting. In nearly all instances wherein the molar ratio of formaldehyde to complex exceeds about two in the starting mixtures, the products are insoluble in common organic solvents. A similar effect on the polymer solubility is noted as the concentration of the complex in the starting mixture is changed, although the ratio of complex to aldehyde remains constant. For instance, for a formaldehyde-to-complex ratio of two, if the reaction is carried out at high dilution, i.e., of the order of 0.01 molar, sulfonation of the aromatic rings of the polymer occurs and products quite soluble in solvents such as dimethyl sulfoxide are obtained. At the same reactant ratios, but at a concentration of at least 0.15 molar, on the other hand, little or no sulfonation occurs, the product is much less soluble and appears to be more highly cross-linked. At a concentration of 1 molar in sulfuric acid, an insoluble product forms.

The soluble polymers of this invention are useful as coatings, especially for bonderized steel panels. For example, 10–30% solutions of the polymers, the solvent being determined by the solubility characteristics of the particular polymer, are puddled or flowcoated on steel panels, the casting is allowed to dry and then is baked at about 70° C. Transparent coatings, often colored and lustrous, with good adhesion and hardness are formed. The polymers are also useful as fillers in adhesive compositions.

Many modifications will be apparent to those skilled in the art from a reading of the above without a departure from the inventive concept.

What is claimed is:
1. A process for preparing a condensation polymer of cyanopentabenzylisonitrileiron (II) cation and an aldehyde, said polymer being neutralized electrically by hydrogen sulfate anions, which comprises contacting a sulfuric acid solution of a cyanopentabenzylisonitrileiron (II) salt with an aldehyde selected from the group consisting of formaldehyde and an alkyl aldehyde.

2. A condensation polymer prepared by the process of claim 1.

3. The process of claim 1 wherein said salt is selected from the group consisting of hydrogen sulfate, bromide, chloride, and iodide salts.

4. A process for preparing a condensation polymer of cyanopentabenzylisonitrileiron (II) cation and an aldehyde, said polymer being neutralized electrically by hydrogen sulfate anions, which comprises contacting a sulfuric acid solution of the hydrogen sulfate salt of cyanopentabenzylisonitrileiron (II) cation within an aldehyde selected from the group consisting of formaldehyde and an alkyl aldehyde of 2 to 13 carbons at a temperature of about from 5 to 75° C.

5. The process of claim 4 wherein the sulfuric acid is in the form of an aqueous solution containing at least 75% sulfuric acid.

6. The process of claim 4 wherein the sulfuric acid is concentrated sulfuric acid and the temperature is from about 5 to 60° C.

References Cited by the Examiner

Asperger et al., Journal Chemical Society, pages 1449–54 (1955).

Kirigakubo, Chemical Abstracts, vol. 26, page 2390 (1932).

JOSEPH L. SCHOFER, *Primary Examiner.*

H. N. BURSTEIN, *Examiner.*

UNITED STATES PATENT OFFICE
CERTIFICATE OF CORRECTION

Patent No. 3,239,473                                        March 8, 1966

Walter Zygfried Heldt

It is certified that error appears in the above identified patent and that said Letters Patent are hereby corrected as shown below:

Column 8, line 64, after "aldehyde" insert -- of 2 to 13 carbons --.

Signed and sealed this 20th day of January 1970.

(SEAL)
Attest:

Edward M. Fletcher, Jr.                        WILLIAM E. SCHUYLER, JR.
Attesting Officer                                    Commissioner of Patents